United States Patent [19]
Chang et al.

[11] Patent Number: 6,006,327
[45] Date of Patent: Dec. 21, 1999

[54] OPTION SETTING DEVICE AND METHOD FOR PROVIDING VARIOUS SETTINGS THROUGH SOFTWARE MEANS TO A COMPUTER MOTHERBOARD

[75] Inventors: Wen-Ching Chang, Yong-Ho; Yen-Liang Chen, Taipei; Minjay Su, San-Chung, all of Taiwan

[73] Assignee: Via Technologies, Inc., Taipei, Taiwan

[21] Appl. No.: 09/131,569

[22] Filed: Aug. 10, 1998

[30] Foreign Application Priority Data

Jun. 6, 1998 [TW] Taiwan .................................. 87108989

[51] Int. Cl.[6] ...................................................... G06F 15/00
[52] U.S. Cl. .................................................. 713/1; 713/502
[58] Field of Search ..................................... 713/1, 2, 100, 713/600, 502

[56] References Cited

U.S. PATENT DOCUMENTS 4,796,211  1/1989  Yokouchi et al. .......................... 714/55
5,862,351  1/1999  He ............................................ 710/104

Primary Examiner—Thomas M. Heckler
Attorney, Agent, or Firm—Thomas, Kayden, Horstemeyer & Risley

[57] ABSTRACT

An option setting device and method is provided for use on a computer mother-board for providing various user-defined settings to the motherboard. The motherboard includes a CPU, a chip set coupled to the CPU, a clock generator coupled to the chip set, a delay circuit coupled to the chip set, a first latching circuit coupled to the chip set, and a reset circuit coupled to the delay circuit. After the motherboard is power on, the CPU transfers a first setting via the chip set to the first latching circuit so as to allow the first setting to be latched in the first latching circuit, and meanwhile triggers the delay circuit to start counting time. The delay circuit outputs a trigger signal to the reset circuit after a preset time, causing the reset circuit to restart the motherboard. After the motherboard is restarted, the chip set fetches the first setting from the first latching circuit so as to be set accordingly. In the case of the motherboard further having a voltage regulator, the option setting device and method further utilizes a second latching circuit for latching a second setting from the CPU and then transferring the latched setting to the voltage regulator to cause the voltage regulator to output a voltage accordingly.

6 Claims, 2 Drawing Sheets

OPTION SETTING DEVICE AND METHOD FOR PROVIDING VARIOUS SETTINGS THROUGH SOFTWARE MEANS TO A COMPUTER MOTHERBOARD

CROSS-REFERENCE TO RELATED APPLICATION

This application claims the priority benefit of Taiwan application serial no. 87108989, filed Jun. 6, 1998, the full disclosure of which is incorporated herein by reference.

BACKGROUND OF THE INVENTION

1. Field of the Invention

This invention relates to computer motherboards, and more particularly, to an option setting device and method for use on a computer motherboard to provide various settings to the computer motherboard through software means instead of jumpers, thus allowing the computer motherboard to be more easily manufactured and used.

2. Description of Related Art

IBM-compatible personal computers (PC) are the most popular computer systems around the world. Earlier IBM-compatible PCs were constructed in compliance with the PC/XT and PC/AT standards. With technologies becoming more sophisticated and diversified, however, present computer motherboards are constructed in compliance with a great variety of standards. For instance, earlier CPUs were typically 4.77 MHz (megahertz) in speed, but today's high-end CPUs run at more than 300 MHz. Moreover, earlier CPUs were driven by a system voltage of 5 V (volt), but today's CPUs are driven by a system voltage of 3 V or even lower.

For compatibility reasons, many manufactures integrate the various standards on a single motherboard and provide jumper means (referred to as an option setting device in this specification) to allow the user to select the desired options. For example, the option setting device may allow the user to choose one frequency from 133 MHz, 166 MHz, 200 MHz, and 233 MHz as the clock rate to drive the CPU. Further, the option setting device may allow the user to choose between internal and external clock rates ad for the CPU and choose one voltage from 3.3 V and 2.8 V as the system voltage to drive the CPU. Beside the CPU, the motherboard may include various other components, such as a PCI (Peripheral Component Interconnect) interface, an AGP (Accelerated Graphics Port) interface, and a memory interface, for the installation of various expansion cards on the motherboard. These interfaces may run on various different clock rates and voltages that the user is required to set before operation.

In view of the foregoing requirements, a conventional computer motherboard is typically provided with a number of jumpers to allow the user to choose between all the available options. When there are too many available options, the motherboard may include such a great number of jumpers that it would be very difficult for ordinary users to implement the settings quickly and correctly. In the event of wrong settings, the computer motherboard may be inoperable or even suffer from system crash. It is therefore highly desirable to reduce or even entirely eliminate the jumpers and instead use software means to implement the settings.

FIG. 1 is a schematic system diagram showing the use of a conventional jumper-sharing scheme on a computer motherboard to help reduce the number of jumpers. As shown, the computer motherboard utilizing the jumper sharing scheme includes a clock generator 120 and a chip set 130, both of which are designed to share the same set of jumpers—a first jumper 111, a second jumper 112, and a third jumper 113. The clock generator 120 is used to generate a system clock signal for driving the motherboard, with the clock rate being dependent on the particular combination of the logic states at the FS1, FS2, and FS3 ports that is set via the three jumpers 111, 112, 113 to either the system voltage $V_{cc}$ (the high-voltage logic state) or the ground (the low-voltage logic state).

Moreover, the chip set 130 can be used to set the clock rates respectively used to clock the CPU (not shown), the AGP interface (not shown), and the PCI interface (not shown), which are dependent on the particular combination of the logic states at the HA1, HA2, HA3 ports that are also set via the three jumpers 111, 112, 113 to either the system voltage $V_{cc}$ or the ground. The clock generator 120 and the chip set 130 can share the same set of jumpers 111, 112, 113 because the clock rates for the CPU, the AGP interface, and the PCI interface are related to the system clock rate generated by the clock generator 120.

Therefore, the jumper-sharing scheme can help reduce the number of required jumpers on the computer motherboard. Since the HA1, HA2, HA3 ports of the chip set 130 may not be set to the same logic states as the FS1, FS2, FS3 ports of the clock generator 120, an adapting circuit composed of three tri-state buffers 141, 142, 143 and two inverters 151, 152 is provided between the jumpers 111, 112, 113 and the chip set 130 to alter the logic states to the ones desired for the chip set 130.

It is to be noted that the adapting circuit shown in FIG. 1 is only an example; the actual configuration is dependent on the specifications of the integrated circuit being used as the chip set 130. Furthermore, the chip set 130 is provided with a $\overline{REST}$ port, which is connected to receive a $\overline{DRST}$ signal. The $\overline{DRST}$ signal is also used to control the tri-state buffers 141, 142, 143 in such a manner that when it is switched to a first logic state, for example a low-voltage logic state, it switches the buffers 141, 142, 143 to the conducting state, thereby allowing the transfer of the logic voltage states set by the three jumpers 111, 112, 113 respectively to the HA1, HA2, HA3 ports of the chip set 130; and when switched to a second logic state, for example a high-voltage logic state, it switches the buffers 141, 142, 143 to non-conducting state. In the latter condition, the HA1, HA2, HA3 ports of the chip set 130 can be used as output ports for address signals.

The foregoing jumper sharing scheme allows the clock generator 120 and the chip set 130 to share the same set of jumpers 111, 112, 113 to receive the user-defined settings. One drawback to this scheme, however, is that when other makes of devices with different specifications are used as the clock generator and the chip set, the adapting circuit (i.e., the buffers 141, 142, 143 and the inverters 151, 152) between the jumpers 111, 112, 113 and the chip set 130 may have to be redesigned in compliance with the new specifications of the clock generator and the chip set.

The manufacture of the motherboard would be therefore quite cost-ineffective. Moreover, if an advanced device having a software frequency programming capability is used as the clock generator 120, the scheme of using jumpers to set options would not allow such a clock generator to be fully utilized in its advanced functionality.

As a summary, the prior art of FIG. 1 has the following disadvantages in manufacture and utilization.

(1) First, the prior art is quite cost-ineffective for the suppliers to manufacture, in that when another make of clock generator and chip set are used, the adapting circuit may have to be totally redesigned so as to allow the new clock generator and the new chip set to share the same set of jumpers.

(2) Second, the scheme of using jumpers to set an advanced clock generator having a software frequency programming capability would not allow the clock generator to be fully utilized in its advanced functionality.

(3) Third, the scheme of using jumpers to provide various settings to the motherboard would be user-unfriendly to most computer users and could easily result in wrong settings.

SUMMARY OF THE INVENTION

It is therefore an objective of the present invention to provide an option setting device and method for providing various settings to a computer motherboard, which allow the computer motherboard to be set through software means without using jumpers so that the computer motherboard is more user-friendly.

It is still another objective of the present invention to provide an option setting device and method for providing various settings to a computer motherboard, which allows the computer motherboard to use various makes of clock generators and chip sets without having to redesign any existing circuit part on the computer motherboard.

It is yet another objective of the present invention to provide an option setting device and method for providing various settings to a computer motherboard, which allow an advanced clock generator having a software frequency programming capability to be fully utilized to offer its advanced functions.

In accordance with the foregoing and other objectives of the present invention, an option setting device and method for providing various settings to a computer motherboard is proposed.

The option setting device and method of the invention is designed for use on a computer motherboard for providing various user-defined settings to the motherboard. The motherboard includes a CPU, a chip set coupled to the CPU, a clock generator coupled to the chip set, a delay circuit coupled to the chip set, a first latching circuit coupled to the chip set, and a reset circuit coupled to the delay circuit.

After the motherboard is power on, the CPU transfers a first setting via the chip set to the first latching circuit so as to allow the first setting to be latched in the first latching circuit, and meanwhile triggers the delay circuit to start counting time. The delay circuit outputs a trigger signal to the reset circuit after a preset time, causing the reset circuit to reset the motherboard. After the motherboard is restarted, the chip set fetches the first setting from the first latching circuit so as be set accordingly. In the case of the motherboard further having a voltage regulator, the option setting device and method further utilizes a second latching circuit for latching a second setting from the CPU and then transfers the latched setting to the voltage regulator to cause the voltage regulator to output a voltage accordingly.

The method of the invention comprises the following procedural steps. At first, a first latching circuit and a delay circuit are installed on the motherboard. Next, the motherboard is started. Then, the CPU is actuated to transfer a first setting to the first latching circuit for the first latching circuit to latch the first setting, and meanwhile triggering the delay circuit to start counting time. Next, the CPU is actuated to transfer a user-selected clock rate setting to the clock generator. Next, when the delay circuit reaches a preset time, the reset circuit is triggered to restart the motherboard. After the motherboard is restarted, the chip set is actuated to fetch the first setting from the first latching circuit to set the chip set accordingly.

In the case of the motherboard further having a voltage regulator for supplying a system voltage to the CPU, the method of the invention further comprises the steps as described hereinafter. A second latching circuit is installed on the motherboard. Next, the CPU is actuated to transfer a second setting to the second latching circuit for the second latching circuit to latch the second setting, the second latching circuit then transfers the latched second setting to the voltage regulator to cause the voltage regulator to output a voltage accordingly.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
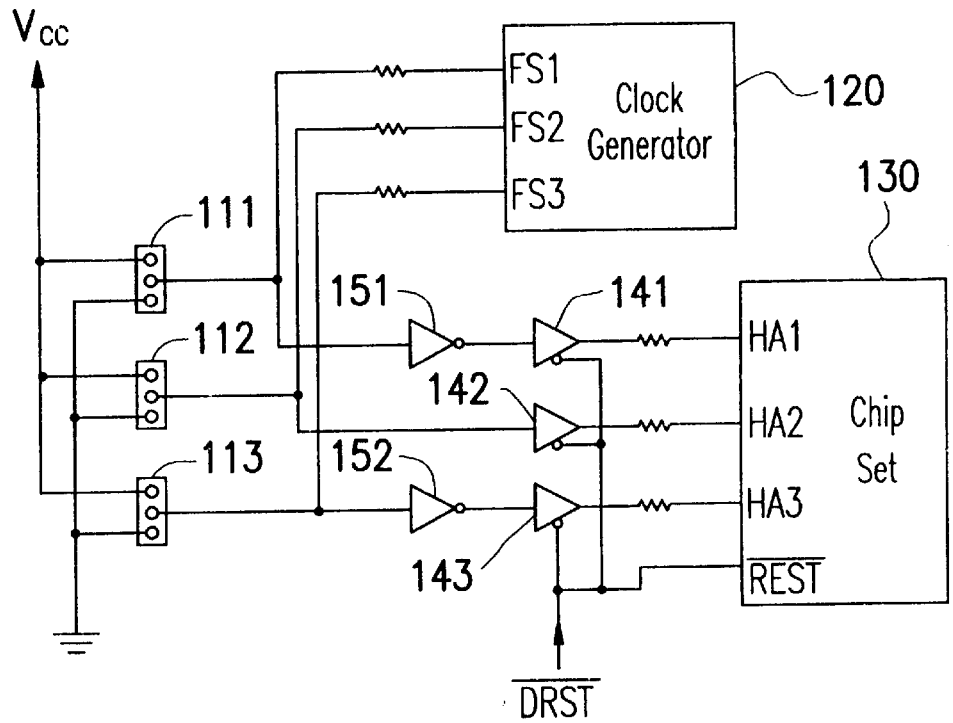
FIG. 1 is a schematic system diagram showing the use of a conventional jumper-sharing scheme on a computer motherboard to reduce the number of jumpers.
Figure 2:
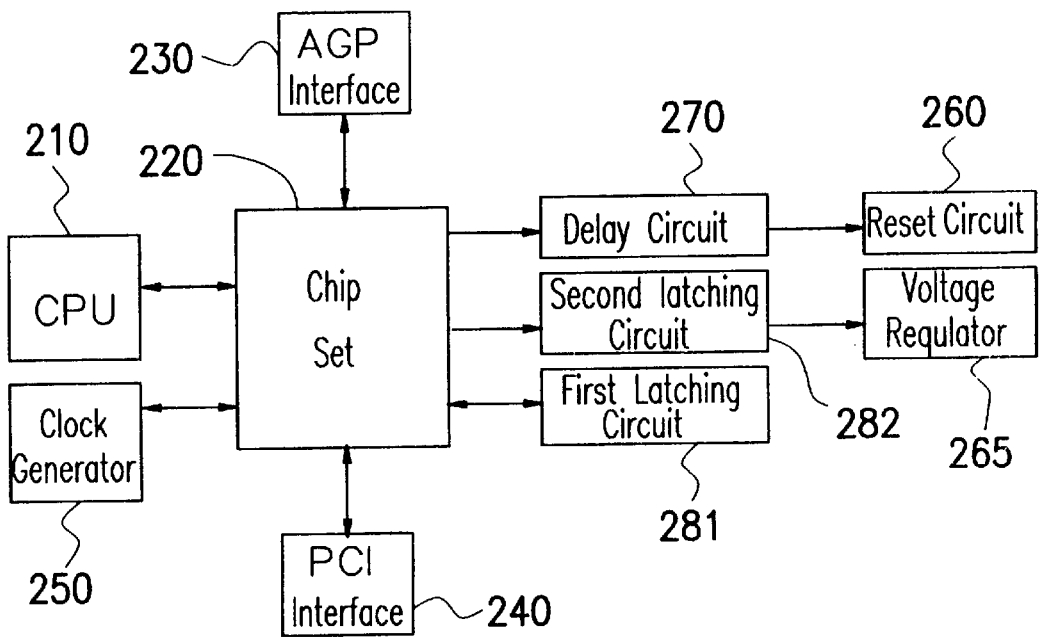
FIG. 2 is a schematic block diagram of a computer motherboard utilizing the option setting device and method according to the invention.

FIG. 2 is a schematic block diagram of a computer motherboard, designated by the reference numeral 200, which utilizes the option setting device and method according to the invention.

As shown, the computer motherboard 200 utilizing the option setting device and method of the invention includes a CPU 210, a chip set 220, an AGP interface 230, a PCI interface 240, a clock generator 250, a reset circuit 260, a voltage regulator 265, a delay circuit 270, a first latching circuit 281, and a second latching circuit 282. The CPU 210 is used to control all the operations of the motherboard 200 and the chip set 220 contains all the control functions in a single integrated circuit for the CPU 210. The CPU 210 can control the AGP interface 230, the PCI interface 240, and the clock generator 250 via the chip set 220. The clock generator 250 is used to generate a system clock signal used to drive the CPU 210 and other components on the motherboard 200. The AGP interface 230 is used for the installation of an AGP card (not shown), and the PCI interface 240 is used for the installation of a PCI card (not shown).

The delay circuit 270, the first latching circuit 281, and the second latching circuit 282 are provided specifically for the purpose of allowing the user to set options to the motherboard 200 through software means. For example, when it is desired to set the voltage regulator 265 to output a specific voltage to serve as a system voltage for the motherboard 200, the CPU 210 issues and transfers the corresponding setting via the chip set 220 to the second latching circuit 282 to be latched therein. Then, the second latching circuit 282 outputs the setting to the voltage regulator 265 to cause the voltage regulator 265 to output the specified voltage to drive the motherboard 200. The first latching circuit 281 is used to latch the settings for the clock rates used to drive the AGP interface 230 and the PCI interface 240. Furthermore, the CPU 210 also controls the delay circuit 270 via the chip set 220 and the output of the delay circuit 270 is used to trigger the reset circuit 260 to restart the motherboard 200.

Figure 3:
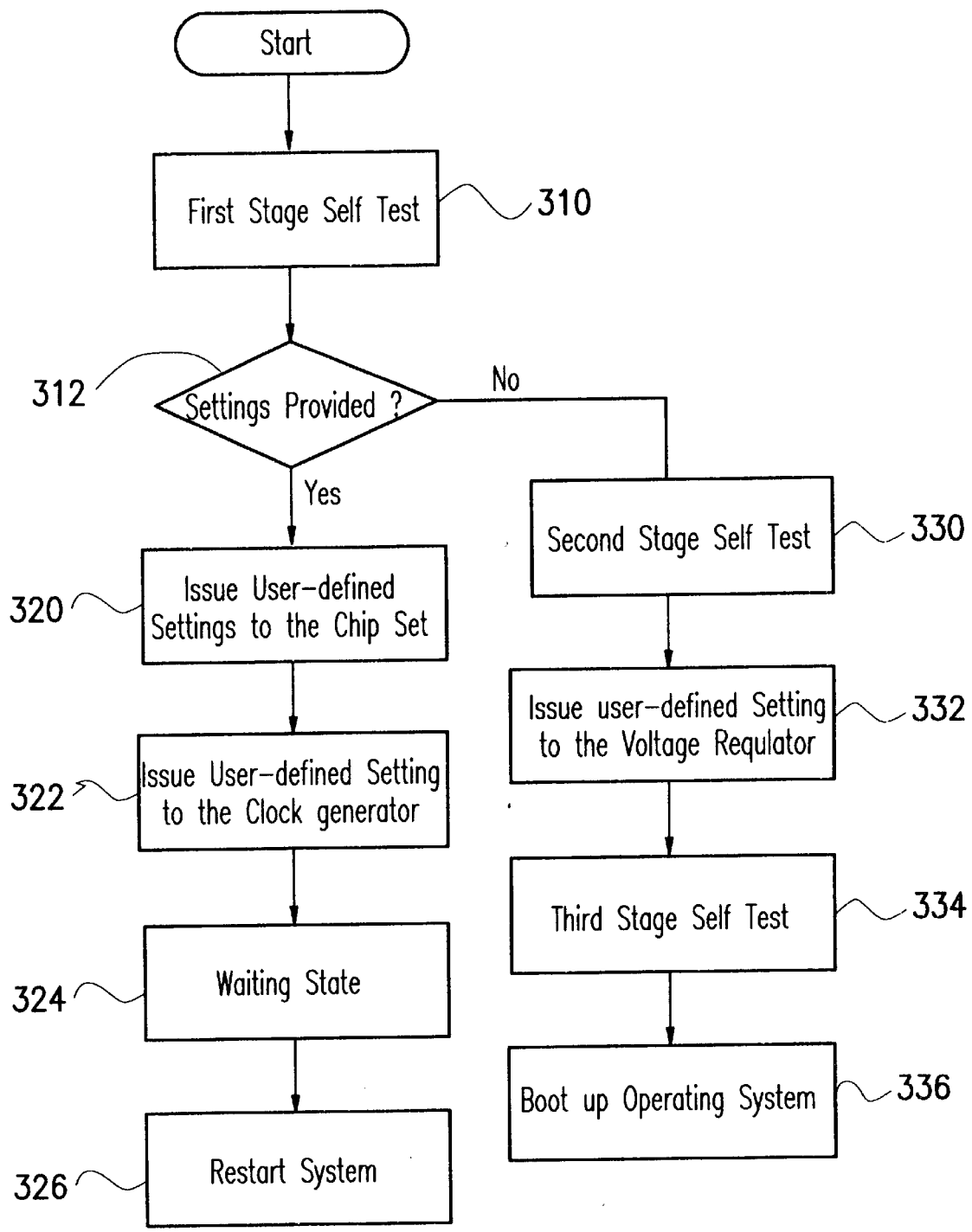
FIG. 3 is a flow diagram showing the procedural steps involved in the method of the invention to provide settings to the computer motherboard.

With the foregoing architecture, the option setting device and method of the invention can provide various settings to the motherboard 200 through a software procedure. The flow chart of this software procedure is shown in FIG. 3.

As shown, in the first step 310 after power on, the motherboard 200 performs a first stage self test including a series of POSTs (Power On Self Test) to check all the hardware components thereon.

In the next step 312, the motherboard 200 checks whether settings are already provided to the motherboard 200. If they are, the procedure goes to the step 320; otherwise, if not, the procedure goes to the step 330. After the power is just turned on, the procedure goes to the step 320.

In the step 320, the user-defined frequency settings to the CPU 210, the AGP interface 230, and the PCI interface 240 and the frequency ratio between these and various other components on the motherboard 200 are transferred by the CPU 210 via the chip set 220 to the first latching circuit 281. This allows the chip set 220 to adjust the timings and sequences of its internal operations according to these settings. Meanwhile, the delay circuit 270 is triggered to start counting time.

In the subsequent step 322, the CPU 210 issues a user-selected clock rate setting via the chip set 220 to the clock generator 250 to cause the clock generator 250 to output a clock signal with a specified rate to serve as the system clock signal used to drive the motherboard 200. It is to be noted that the system clock signal cannot be altered in frequency during operation of the motherboard 200, or the computer system is shut down.

In the next step 324, if the clock generator 250 is altered in its output clock rate, the motherboard 200 is shut down, thus terminating all current operations. If the output clock rate is not altered, the CPU 210 enters into a waiting state for the restart of the motherboard 200.

In the subsequent step 326, when the delay circuit 270 reaches the preset time, it outputs a trigger signal to cause the reset circuit 260 to restart the motherboard 200. Since the motherboard 200 can be shut down anytime after the clock generator 250 has been set, the delay circuit 270 should be triggered before the clock rate setting is sent to the clock generator 250 so as to allow the motherboard 200 to be able to be self restarted after shutdown. However, the delay time caused by the delay circuit 270 should be long enough to allow the clock generator 250 to complete the setting.

When the motherboard 200 is restarted, since before this the power is still on, the settings that were previously latched in the first latching circuit 281 are still retained there. These settings are then fetched by the chip set 220 from the first latching circuit 281 for the chip set 220 to adjust the timings and sequences of its internal operations accordingly. Meanwhile, the clock generator 250 outputs the specified clock rate in accordance with the setting received before the restart.

After the motherboard 200 is restarted, the step 310 is executed again to perform the POSTs. In the subsequent step 312, the procedure checks whether settings are already provided to the motherboard 200. At this stage, the result of the step 312 is yes since the motherboard 200 is restarted without power-off after performing the steps 320 through 324. Therefore, the procedure then goes to the step 330.

In the step 330, a second stage self-test is performed to check the motherboard 200.

In the next step 332, the CPU 210 transfers the user-selected voltage setting to the second latching circuit 282. The second latching circuit 282 then latches and transfers the voltage setting to the voltage regulator 265 to cause the voltage regulator 265 to output a specified voltage in accordance with the received setting. The output voltage from the voltage regulator 265 is then used as the system voltage to drive the CPU 210.

The CPU 210, if a new and advanced type, can operate under a system voltage from 2.2–3.5 V and can work under a voltage near its rated system voltage for a short while. Therefore, before setting the voltage regulator 265, the voltage regulator 265 first supplies a provisional voltage to the CPU 210 (for example, 2.2 V or 3.0 V, depending on the particular type of the CPU 210) to allow the CPU 210 to be operable when performing the steps 310 through 326. After that, the actual voltage setting is sent to the voltage regulator 265 to cause it to output the desired voltage.

In the next step 334, a third stage self test is performed to check the motherboard 200.

In the subsequent step 336, the motherboard 200 initiates a boot from the hard disk (not shown) of the computer system to boot up the operating system. This concludes the procedural steps in the method of the invention to provide settings to the motherboard 200.

From the foregoing description, it can be learned that the invention is characterized by the addition of some setting steps among the self-test procedures to provide various settings to the motherboard 200. Although the motherboard 200 needs to be restarted after the clock generator 250 has been set, it does not take too much time or cause too much trouble to the user since the duration between the power-on and the restarting is very short. Moreover, in order to allow the computer system to be operable before the settings are provided to the motherboard 200, a specific logic combination can be preset via resistor means to some specific input pins on the motherboard 200 so as to pull these pins to either a high-voltage logic state or a low-voltage logic state that allows the computer system to be capable of starting. After that, the desired settings can be provided to the motherboard 200 to cause the computer system to work accordingly.

Moreover, the invention is characterized by the provision of a hardware latching means on the motherboard so as to latch the settings before restarting the computer system, allowing the settings to be retained when restarting the computer system. Moreover, the invention provides a delay circuit to trigger the reset circuit after a preset time to restart the computer system. After the computer system is restarted, it can work under the specified clock rate generated by the clock generator. With the invention, the motherboard needs no hardware jumpers and can provide various settings to the motherboard through software means, thus allowing the setting of various options to the motherboard to be more user-friendly. Moreover, the user-defined settings can be checked by software for any errors, allowing the operation of the computer system to be more reliable.

In conclusion, the option setting device and method of the invention has the following advantages over the prior art.

(1) First, the invention allows the motherboard to replace the chip set and the clock generator with other makes without having to modify much of the circuitry thereof, thus allowing the motherboard to be more flexible and cost-effective in manufacture and utilization.

(2) Second, in the case of using an advanced clock generator having a software frequency programming capability, the invention allows such a clock generator to be more fully utilized in its advanced functionality through software programming that would be otherwise restricted when using jumpers as in the prior art.

(3) Third, the invention allows the settings to be provided through software means, to the motherboard, which is more user-friendly to carry out and allows the operation of the computer system to be more reliable since unfeasible settings can be checked out by software.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An option setting device for use on a computer motherboard having a CPU, a chip set serving as a control unit for the CPU, a clock generator coupled to the chip set, and a reset circuit, for the purpose of providing user-defined settings to the motherboard, the option setting device comprising:

a first latching circuit coupled to the chip set; and a delay circuit coupled between the chip set and the reset circuit;

wherein when the motherboard is powered on, the CPU transfers a first setting via the chip set to the first latching circuit so as to allow the first setting to be latched in the first latching circuit, and meanwhile triggers the delay circuit to start counting time, the delay circuit outputting a trigger signal to the reset circuit after a preset time, causing the reset circuit to restart the motherboard; and after the motherboard is restarted, the chip set fetches the first setting from the first latching circuit so as to be set accordingly.

2. The option setting device of claim 1, wherein in the case of the motherboard further having a voltage regulator for supplying a system voltage to the CPU, the option setting device further comprises a second latching circuit, coupled between the chip set and the voltage regulator, for latching a second setting received via the chip set from the CPU and transferring it to the voltage regulator to cause the voltage regulator to output a voltage in accordance with the second setting.

3. A method for use on a computer motherboard having a CPU, a chip set serving as a control unit for the CPU, a clock generator coupled to the chip set, and a reset circuit, for the purpose of providing user-defined settings to the motherboard, the method comprising the steps of:

installing a first latching circuit and a delay circuit on the motherboard;

starting the motherboard;

actuating the CPU to transfer a first setting to the first latching circuit for the first latching circuit to latch the first setting, and meanwhile triggering the delay circuit to start counting time;

actuating the CPU to transfer a user-selected clock rate setting to the clock generator;

when the delay circuit reaches a preset time, triggering the reset circuit to restart the motherboard; and after the motherboard is restarted, actuating the chip set to fetch the first setting from the first latching circuit to set the chip set accordingly.

4. The method of claim 3, further comprising, in the case of the motherboard further having a voltage regulator for supplying a system voltage to the CPU, the steps of:

installing a second latching circuit on the motherboard; and actuating the CPU to transfer a second setting to the second latching circuit for the second latching circuit to latch the second setting, the second latching circuit then transferring the latched second setting to the voltage regulator to cause the voltage regulator to output a voltage in accordance with the second setting.

5. A computer motherboard, comprising:

a CPU;

a chip set serving as a control unit for the CPU;

a clock generator coupled to the chip set;

a delay circuit coupled to the chip set;

a first latching circuit coupled to the chip set; and a reset circuit coupled to the delay circuit, capable of restarting the motherboard in response to a trigger signal outputted from the delay circuit;

wherein when the motherboard is powered on, the CPU transfers a first setting via the chip set to the first latching circuit so as to allow the first setting to be latched in the first latching circuit and meanwhile triggers the delay circuit to start counting time, the delay circuit outputting a trigger signal to the reset circuit after a preset time, causing the reset circuit to reset the motherboard; and after the motherboard is restarted, the chip set fetches the first setting from the first latching circuit so as to be set accordingly.

6. The computer motherboard of claim 5, wherein in the case of the motherboard further having a voltage regulator for supplying a system voltage to the CPU, the option setting device further comprises a second latching circuit, coupled between the chip set and the voltage regulator, for latching a second setting received via the chip set from the CPU and transferring it to the voltage regulator to cause the voltage regulator to output a voltage in accordance with the second setting.

* * * * *